United States Patent
Leermakers

(10) Patent No.: US 6,634,022 B1
(45) Date of Patent: Oct. 14, 2003

(54) METHOD FOR PLATFORM SPECIFIC EFFICIENCY ENHANCEMENT OF JAVA PROGRAMS AND SOFTWARE PRODUCT THEREFOR

(75) Inventor: Rene Leermakers, Einav, D.N. Shomron (IL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/428,766

(22) Filed: Oct. 28, 1999

(51) Int. Cl.[7] .............................. G06F 9/45; G06F 9/44
(52) U.S. Cl. .................. 717/158; 717/116; 717/118
(58) Field of Search ................. 717/100–123, 717/136–149, 151–167; 709/313, 328, 320–321

(56) References Cited

U.S. PATENT DOCUMENTS

| | | | |
|---|---|---|---|
| 5,884,083 A | | 3/1999 | Royce et al. ................. 717/143 |
| 5,933,144 A | | 8/1999 | Alcorn ......................... 345/809 |
| 5,937,193 A | * | 8/1999 | Evoy ............................ 717/140 |
| 6,128,011 A | * | 10/2000 | Peng ............................ 345/744 |
| 6,237,135 B1 | * | 5/2001 | Timbol ........................ 717/107 |
| 6,269,480 B1 | * | 7/2001 | Curtis .......................... 717/106 |
| 6,295,643 B1 | * | 9/2001 | Brown et al. ................. 717/148 |
| 6,317,872 B1 | * | 11/2001 | Gee et al. .................... 717/152 |
| 6,320,592 B1 | * | 11/2001 | Evans et al. ................. 345/600 |
| 6,332,216 B1 | * | 12/2001 | Manjunath ................... 717/141 |

FOREIGN PATENT DOCUMENTS

| | | | |
|---|---|---|---|
| EP | 0913769 A2 | 5/1999 | ............. G06F/9/44 |
| WO | WO9837486 | 8/1998 | ........... G06F/9/445 |
| WO | WO9853398 | 11/1998 | ........... G06F/9/445 |
| WO | WO9917191 | 4/1999 | ............. G06F/9/00 |

OTHER PUBLICATIONS

"The Java™ Language Environment A White Paper" by James Gosling et al, Sun Microsystems, May 1996.

* cited by examiner

*Primary Examiner*—Hoang-Vu Antony Nguyen-Ba

(57) ABSTRACT

A method for optimizing and enhancing Java programs to run more efficiently on specific hardware platforms, with a focus on increased execution performance and a reduction of the amount of memory the Java program ultimately requires for its functionality, includes steps for using new classes which define constants and specialization functions to identify and modify existing classes associated with a Java program. The method depends on the evaluation and analysis of the constants, with the results of such evaluation and analysis determining what kind of code specialization occurs. As an optional step, the resulting platform enhanced Java classes overwrite the original Java classes, which permits the modified classes to be utilized by the same Java program or other Java programs running on the same hardware platform when the Java programs are run in the future. A software product is also described.

22 Claims, 3 Drawing Sheets

```
class Constant {
// class constuctors
Constant (String className, String varName);
                              // static variable varName of class className is
                              //      constant Constant (String className);// all static variables of className are constant static void disableErrors();  // disables run-time errors to eliminate overhead for
                              //      well-tested programs static void enableErrors();   // enabled run-time errors; this is default behavior
} class Specialize {
Boolean static specializeFor(String[] classes, Constant[] constants);
                              // specializes classes for constants static void disable();        // makes specializeFor do nothing;
                              //      for debugging purposes static void enable();         // restores functionality of specializeFor
}
```

FIG. 1

METHOD FOR PLATFORM SPECIFIC EFFICIENCY ENHANCEMENT OF JAVA PROGRAMS AND SOFTWARE PRODUCT THEREFOR

BACKGROUND OF THE INVENTION

The present invention relates to methods improving and enhancing the operation of Java programs on various hardware platforms. More specifically, the present invention relates to method for employing a new set of platform-specific Java classes to both reduce the size of the resulting Java executable code and to provide a performance improvement when the Java executable code is run. A software product is also disclosed.

Developers of programs which are platform aware due to their compilation and execution model, such as those developed in the C and C++ programming languages, can take advantage of language preprocessors. The preprocessor for a language like C also permits a developer to define (e.g. via the #define directive) and use fixed constants. Such constants are frequently platform specific in nature. Language preprocessors also allow for the inclusion of conditional directives (e.g. #ifdef or #if), which in turn are used to select specific variants of code to be included or excluded during the subsequent compilation process, which in turn has an effect on the executable file produced by the compiler. The use of such constants and directives allows developers and language compiler software to better tune the output of the program compilation process in order to it generate and execute more space and performance efficient machine-specific code. This is particularly of interest when developing software for embedded devices such as those which exist in the new category of information appliances.

Java is a totally object-oriented, platform independent programming language, which achieves architectural independence by compiling source code into its own intermediate representation. Java source code is not compiled into normal machine code, but is translated into code, i.e., bytecode, for a virtual machine specifically designed to support Java's features. A Java interpreter or a Java-enabled browser then executes the translated code. While Java source code must be compiled, no link step is required since the Java interpreter dynamically links the translated code at run time. Java programs are usually classified as either applications, which are run on a Java interpreter, or applets, which are run by a Java-enabled browser. See U.S. Pat. No. 5,933,144, which patent is incorporated herein by reference for all purposes.

Java Beans is a component model for building and using Java-based software components. A "bean" is simply a Java class with extra descriptive information, similar to the concept of an object linking and embedding (OLE) type library. Unlike an OLE library, however, a bean is usually self-describing, including a file which contains the class's symbol information and method signatures and which may be scanned by a development tool to gather information about the bean. Any Java class with public methods may be considered a bean, but a bean typically has properties and events as well as methods.

Java is well-suited for implementation in graphical user environments or object-oriented interfaces. The Java abstract window toolkit (AWT) allows graphical user interface (GUI) objects to be treated in a generic manner without regard to the system on which the program is running. Combined with the feature of platform-independence, this feature promotes faster development of Internet and cross-platform software using Java.

Thus, Java, being a highly portable platform independent programming language, does not provide the preprocessing capability available for other languages. Stated another way, Java does not possess an innate ability or capability for being optimized with respect to a specific platform, despite the obvious needs for smaller code sizes and better platform-specific performance. While Java Beans are designed to be adaptable, these beans provide adaptability only at the cost of efficiency in terms of execution time and memory usage. These costs compound the already notable efficiency cost of Java's portability. Moreover, since Java is fast becoming a dominant language in the development of programming for a variety of information appliances and small computing devices such as Java Network Computers, the inability to customize certain programming for the devices in question is a significant drawback in terms of program size and efficiency.

It will be appreciated that the preprocessor technique common to C and C++ languages does not work for Java because Java software is distributed in the compiled class-file format. As such, there needs to be another method used to achieve the efficiency gains of what a preprocessor achieves in C and C++, but compatible with the portable, compiled class-file architecture of Java.

It will also be appreciated that Java run-time optimization tools, such as Just In Time (JIT) compilers, do exist. However, there are no tools which allow for selective code inclusion/exclusion optimizations to occur as a selective process during the initial or on-going use of a Java program. For example, while IBM's international patent WO98/37486 discloses the loading of Java class files on demand, that is more an issue of a Java-specific memory paging technique than one which deals with platform specific optimizations and execution. Moreover, Sun Microsystems's European patent application EP 0913 769 A2 details a method to preprocess and package class files in order to remove duplicate data for better memory usage. However, the EP '769 application does not operate in a fashion remotely similar to that of a language preprocessor, which includes the ability to process conditional control flow directives. Both of the above-mentioned documents are incorporated herein by reference for all purposes.

What is needed is a method for optimizing Java applications in a platform specific manner. Moreover, what is needed is a method for optimizing Java applications in which the platform specific advantages of a tool like a C preprocessor are available. It would be beneficial if the method would employ both constants and conditional logic in optimizing the resultant executable program instruction set. Finally, what is needed is a Java application optimization method which permits a Java program, written to be portable, architecture independent, and secure, e.g., written in the Java language, to self configure itself for a particular hardware platform.

SUMMARY OF THE INVENTION

Based on the above and foregoing, it can be appreciated that there presently exists a need in the art for a method which mitigates the above-described deficiencies. The present invention was motivated by a desire to overcome the drawbacks and shortcomings of the presently available technology, and thereby fulfill this need in the art.

The present invention is directed to methods and corresponding software products for enhancing the efficiency of Java programs, especially as they pertain to the execution on multiple hardware platforms.

In one aspect, the present invention provides a method of creating a platform specific Java application from a cross platform Java application, which includes steps for declaring at least one of the variables associated with the cross platform Java application to be a constant, and purging unused functions and associated variables from the cross platform Java application to thereby produce the platform specific Java application. It will be appreciated that the at least one of the variables is declared constant in a first class while instructions for purging unused classes and associated variables are provided in a second class.

In another aspect, the present invention provides a method of creating a platform specific Java program from a cross platform Java program. Preferably, the method includes steps for defining a Constant class to declare selected variables associated with the cross platform Java program as constants, defining a Specialize class providing functions to specialize classes associated with the cross platform Java program with respect to the declared constants, evaluating the cross platform Java program in a Java run time environment using the declared constants, and modifying at least one of the classes associated with the cross platform Java program to thereby produce modified classes delimiting the platform specific Java program.

Preferably, the modifying step can encompass one or more of the following steps:

purging unused functions and associated variables from at least one of the classes associated with the cross platform Java program to thereby produce at least one first modified class;

replacing an existing function with a new function in at least one of the classes associated with the cross platform Java program to thereby produce at least one second modified class; and inserting an additional function into at least one of the classes associated with the cross platform Java program to thereby produce at least one modified class.

In a different aspect, the present invention provides a method permitting creation and implementation of additional Java classes which interact to provide a desired, platform specific result. More specifically, the present invention provides a method of creating a platform specific Java program from a cross platform Java program. Preferably, the method includes steps for:

(a) defining a first Java class which provides the ability to declare constants;

(b) defining a second Java class which provides functions that specialize other classes with respect to the declared constants in the first Java class;

(c) using the first Java class to declare specific constants pertinent to desired platform support capabilities;

(d) using the second Java class to register specialization functions which provide the desired platform support capabilities;

(e) analyzing the execution of a Java application with respect to the constants in the first Java class; and (f) based on the results of the analysis of the constants, performing resultant actions comprising at least one of ignoring, generating, and supplying appropriate desired code using the registered specialization functions specified by the second Java class.

In yet another aspect, the present invention provides a computer program product in a computer readable medium of instructions for creating a platform specific Java application from a cross platform Java application including instructions within the computer readable medium for declaring at least one of the variables associated with the cross platform Java application to be a constant, and instructions within the computer readable medium for purging unused functions and associated variables from the cross platform Java application to thereby produce the platform specific Java application.

According to a still further aspect, the present invention provides a computer program product in computer readable medium of instructions for creating a platform specific Java program from a cross platform Java program. Preferably, the instructions include first instructions within the computer readable medium for defining a Constant class to declare selected variables associated with the cross platform Java program as constants, second instructions within the computer readable medium for defining a Specialize class providing functions to specialize classes associated with the cross platform Java program with respect to the declared constants, third instructions within the computer readable medium for evaluating the cross platform Java program in the Java run time environment using the declared constants, and fourth instructions within the computer readable medium for modifying at least one of the classes associated with the cross platform Java program to instructions within the computer readable medium for thereby produce modified classes delimiting the platform specific Java program.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which:

FIG. 1 is a sample Application Programming Interface (API) for the exemplary embodiment of the invention;

DETAILED DESCRIPTION OF THE PREFERRED EMBODIMENTS

Figure 2:
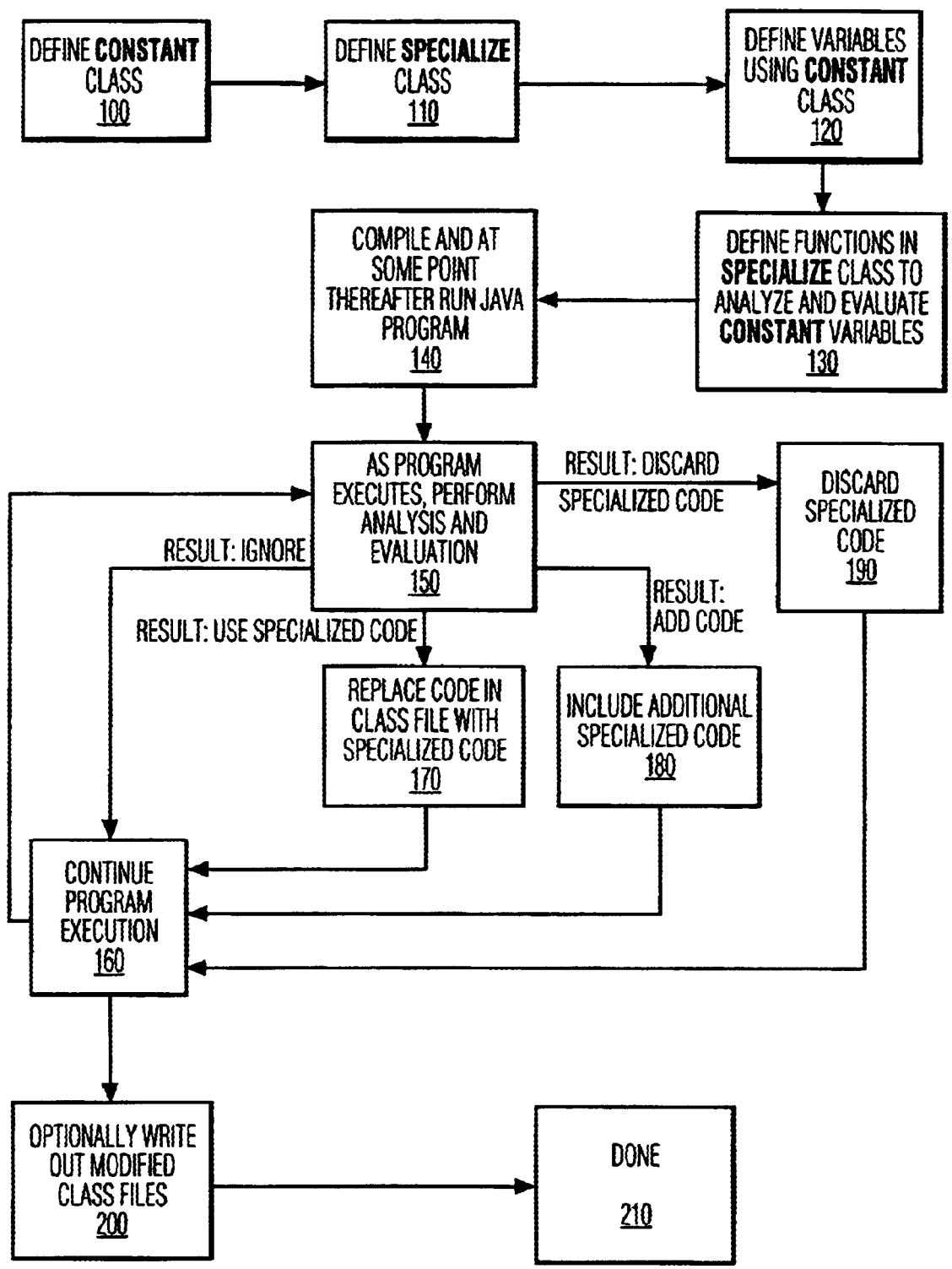
FIG. 2 is a high level flowchart which is useful in understanding how the invention, as described in the exemplary embodiment, operates.

Illustrative embodiment s and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The invention uses the addition of multiple new Java classes to provide the foundation for conditional execution, inclusion, and exclusion of hardware and device specific Java code.

In one exemplary embodiment of the present invention, the inventive method utilizes two new Java classes. The first class provides for definition and registration of constants used for the conditional processing of the Java program. The second class provides for definition of platform specific or specialized code to replace or supplement existing Java classes which require such for greater efficiency in terms of memory consumption and performance. Additional information regarding Java classes can be found in the document by James Gosling and Henry McGilton entitled "The Java Language Environment, A White Paper" (Sun Microsystems, Inc. May 1996), which paper is incorporated herein by reference.

It will be appreciated from the White Paper mentioned above to Java objects, and therefore Java classes, are built from methods. However, since this is likely to result in confusion regarding the inventive methods and the Java object methods, Java object methods will hereinafter be referred to as functions.

More specifically, the exemplary embodiment provides two new class objects and methods for employing the same. These two new class objects are the Constant class and the Specialize class. Both of these classes are discussed in detail immediately below; methods of utilizing these new classes are presented following that discussion.

The first new class is the Constant class, which advantageously can be used to register variables as constant from the time of registration onward. It should be noted that one particularly beneficial effect of the Constant class in this embodiment is that any attempts to modify a previously registered constant can be made to result in a run-time error. It will be appreciated that this feature provides necessary feedback to the programmer developing the software that such an error condition has occurred, since constants are not meant to be modified once created.

It should be mentioned at this point that variables which are ultimately declared to be Constant advantageously can be set based on resource constraints which exist in the current runtime environment of the executing Java program. It should also be mentioned that variables which are declared constant advantageously may correspond to either user preferences at time of initialization or user preferences at time of installation. This declaration of constants can even be invoked as a result of predetermined programmer-derived settings, etc.

As previously mentioned, the second class is the Specialize class, which advantageously provides functions which "specialize" classes with respect to constants. More specifically, specializing a class indicates that the defined functions of the Specialize class will perform evaluations and analysis based on the values of the defined Constants. It will be appreciated that these evaluations and analysis preferably involve:

(1) resolution of switches over constants;
(2) evaluation of computer "if"-statements with constant conditions; and
(3) computing of any expression involving only constants.

Stated another way, the Specialize class replaces classes loaded in the Java run time environment with more efficient ones. Optionally, after being specialized, the resultant optimized classes may be written to a file for future use as already pre-optimized classes. As a result, this combination of Constant and Specialize classes allows overhead code to be purged from standard classes.

The Application Programming Interface (API) used in this particular exemplary embodiment can be seen in FIG. 1. Each of the new classes will be discussed with respect to this Figure below; application of these classes will be discussed with respect to FIG. 2.

The class Constant is defined as containing with two constructors and two class functions. The first constructor allows the selective registration of a variable of a particular class to be registered as a constant. The second constructor permits the registration of all the variables of the specified class as constants.

Moreover, the two class functions are utilized to disable and enable run-time error checking and associated error reporting. It will be appreciated that run-time error checks take up extra clock cycles during execution. During application development, run-time error checking would normally be enabled for debugging. However, once the Java program was deemed to be well tested and sound, the error check advantageously could be turned off to improve execution performance.

Still referring to FIG. 1, the class Specialize is defined as featuring three class functions. The first class function, specializeFor, takes as an argument an array of classes and an array of constants, and employs these arguments to "specialize" the input classes using the provided constants. It should be mentioned that these constants, in turn, can be combinations of classes and variables which have been registered as constants via the Constant class discussed above. This first class function advantageously can perform a programmed evaluation or analysis based on the input classes and constants. It will be appreciated that the analyses could consist purely of a single function applied to all classes and constants passed as parameters. In contrast, a different evaluation procedure could be provided for each combination of input classes and constants.

It should be noted that the specializeFor function is not merely a single step, but can have any level of complexity a programmer or program generator develops or adds, ranging from a simple Boolean operation on provided constants to a complex calculation based on multiple constants. Based on the outcome of the evaluation, the specializeFor function advantageously can substitute specialized code for that in a normal or generic class. For example, the specializeFor function could replace a call to a conventional Java Bean with a call or link to a platform specific Java class. Moreover, the specializeFor function could execute an additional sequence of code to supplement the normal or generic code in a class.

The second and third of the Specialize functions are the disables ( ) function and the enables ( ) function, which advantageously can be utilized to disable or enable the specializeFor functionality. The disables ( ) function is particularly useful when it comes to debugging the specialization code. Stated another way, since the generic Java run time classes will operate normally (albeit slower), and since the specializeFor function can be disabled on command, these results can be compared with one another. It should be mentioned that the specialization functionality provided by the specializeFor for is enabled by a call to the Specialize.enable ( ) function.

FIG. 2 is a flowchart illustrating the methodology for employing these two new classes in a sample application. It will be appreciated that the exemplary application is presumed to be a completed Java application, rather than an Java application under development.

During steps 100 and 110, the Constant and Specialize classes, depicted in the API in FIG. 1, are defined. It will be appreciated that while the steps are drawn as if executed in a specific sequence, these steps advantageously can be performed in the order that suits the user. During step 120, the user defines or registers the variables as Constant, via one or more uses of the Constant class. It will be noted that a call to the Constant class, in turn, calls upon the appropriate constructor functions, based on how many parameters are provided. Here, it should be noted that the variables advantageously can be set via command line options prior to running the Java program. Alternatively, the variables can either be hard coded or heuristically generated as part of a determination process designed to determine the identity of the underlying hardware platform. Moreover, the variables can be entered by the user of the program at run time, i.e., the user can be prompted to supply these variables via a dialog box when the Java program is being installed on the user's computer. Then, during step 130, the contents of the specializeFor function are defined, i.e., the action(s) that is (are) to be taken on various classes based on the constants set in block 120 are defined.

During step 140, the Java application containing the new constants and specialization functions is compiled. At some point after compilation, the resultant program is also executed and starts to run. During the execution of the Java application, the application runs the specializeFor function during step 150. As the Java application runs, it selectively updates and modifies certain classes based on the defined constants, i.e., the modified or updated classes are then utilized during the remainder of the execution. It will be appreciated that these modified and updated classes can be permanently associated with the Java application located on a specific platform during all future executions of the application.

It should be mentioned at this point that since all such modifications or updates are based on the evaluation of the defined constants, there are several results of the evaluation. The three most common evaluation results are as follows:

(1) Ignore the specialization for now, and continue program execution (step 160), which may involve additional evaluation of constants during repeated performance of step 150;

(2) Replace the class in question with specialized code (step 170) and continue program execution during step 160, which may involve additional evaluation of constants during repeated performance of step 150;

(3) Add additional code to the class in question, which advantageously can result in replacement of the current class code with a more enhanced version of the code (step 180), and continue program execution during step 160, which can invoke additional evaluation of constants, i.e., repeated performance of step 150; or (4) Discard the specialized code completely (step 190), since it is virtually certain that the specialized code will not be used while this Java application is running, and continue program execution (step 160), which again can invoke additional evaluation of constants during repeated performance of step 150.

It will be appreciated that other options could involve enabling or disabling the specializeFor function via the second and third functions of the Specialize class discussed above. Additionally, it will be appreciated by one of ordinary skill in the art that there are a virtually unlimited variety of possible evaluation results, such as a numerical result of combining constants in some mathematical way, which have not been shown. What's important is that the results are generated via the use of the constants using code provided in the specializeFor function of the Specialize class.

It should be mentioned that at some point during or after execution of the Java application, the application advantageously can write (during step 200) modified classes. Preferably, the output modified classes incorporate all the specializations defined in the Specialize class, so that future executions of the same Java application, or future executions of another Java programs running on the same hardware platform and calling the same classes, will utilize the modified class(es). Thus, all Java applications calling the classes modified by the Specialize class can benefit from the initial specialization effort without having to redo the specialization effort during each run or for each Java application. It will be appreciated that the employment of the Specialize class with a single Java application can produce dramatic execution overhead for all Java applications calling the modified class(es).

Figure 3:
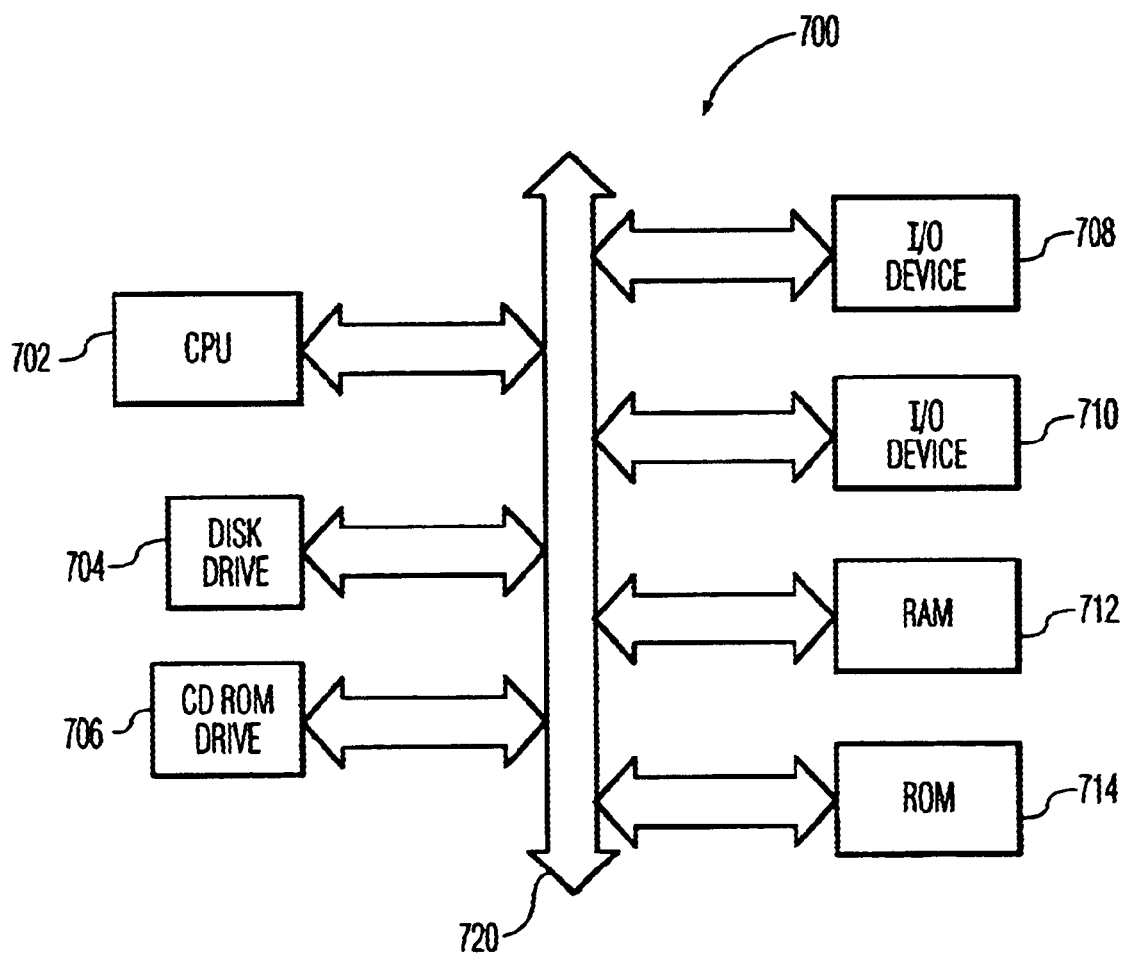
FIG. 3 is a high level block diagram of a general purpose computer which advantageously can be converted to a specific purpose computer by execution of a Java Program in accordance with the method of FIG. 2.

FIG. 3 is a high level block diagram of a central processor-based system 700, which advantageously may be a computer system, a process control system, or any other system employing a processor and associated memory capable of instantiating a Java virtual machine. The system 700 includes a central processing unit (CPU) 702, e.g., a microprocessor, that communicates with a RAM 712 and an I/O device 708 over a bus 720. It must be noted that the bus 720 may be a series of buses and bridges commonly used in a processor-based system, but for convenience purposes only, the bus 720 has been illustrated as a single bus. A second I/O device 710 is illustrated, but is optional. The processor-based system 700 also includes read-only memory (ROM) 714, and may include peripheral devices such as a disk drive 704, e.g., a floppy disk drive or a hard disk drive, and a compact disk (CD) ROM drive 705 that also communicates with the CPU 702 over the bus 720, as is well known in the art. It will be appreciated that the computer readable code corresponding to the Constant and Specialize classes discussed above advantageously can be stored in one of the RAM 712 and disk drive 704.

In summary, the present invention is a method and corresponding software product which provides Java programs with the ability to have conditionally included or excluded sections. It will be appreciated that this facilitates the reduction of the executable code size for better memory utilization in small computing devices with limited memory resources.

Moreover, the preferred embodiments of the present invention provide functionality similar to that of a simple language preprocessor program to the Java language. It will be appreciated that this functionality includes the ability to define constants, to perform partial evaluations on the defined constants, and to permit action(s) to be taken based on the progressive results of such evaluations. Advantageously, the portability of the original Java program being modified to include the new functionality is maintained with the present invention.

As discussed in detail above, the method and corresponding software product according to the present invention permit the replacement of classes in the Java run time environment with more efficient classes. It will be appreciate that this replacement advantageously can be permanent by rewriting and/or modifying the classes with a combination of existing classes and replaced optimized classes.

It will be appreciated that the present invention is not to be limited to the methods and software including one or more of the above-identified objects, i.e., none of the enumerated objects need actually be present in invention defined by the appended claims since only certain, and not all, objects of the invention have been specifically described above. Numerous other objects advantageously may be provided by the invention, as defined in the appended claims, without departing from the spirit and scope of the invention.

Although a presently preferred embodiment of the present invention has been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A method of creating a platform specific Java application, comprising:

receiving a cross platform Java application;

declaring at least one of the variables associated with the cross platform Java application to be a constant; and purging unused functions and associated variables from the cross platform Java application to thereby produce the platform specific Java application.

2. The method as recited in claim 1, wherein the at least one of the variables is declared constant in a first class.

3. The method as recited in claim 2, wherein instructions for purging unused functions and associated variables are provided in a second class.

4. The method as recited in claim 1, wherein instructions for purging unused functions and associated variables are provided in a Specialize class.

5. A method of creating a platform specific Java program from a cross platform Java program, comprising:

defining a Constant class to declare selected variables associated with the cross platform Java program as constants;

defining a Specialized class providing functions to specialized classes associated with the cross platform Java program with respect to the declared constants;

evaluating the cross platform Java program in a Java run time environment using the declared constants; and modifying at least one of the classes associated with the cross platform Java program to thereby produce modified classes delimiting the platform specific Java program.

6. The method as recited in claim 5, wherein the modifying step comprises purging unused variables and associated functions from one of the classes associated with the cross platform Java program to thereby produce modified classes delimiting the platform specific Java program.

7. The method as recited in claim 5, wherein the modifying step comprises replacing an existing function in one of the classes associated with the cross platform Java program with a new function to thereby produce modified classes delimiting the platform specific Java program.

8. The method as recited in claim 5, wherein the modifying step comprises inserting an additional function into one of the classes associated with the cross platform Java program to thereby produce modified classes delimiting the platform specific Java program.

9. The method as recited in claim 5, wherein the modifying step comprises:

purging unused functions and associated variables from at least one of the classes associated with the cross platform Java program to thereby produce at least one first modified class;

replacing an existing function in one of the classes associated with the cross platform Java program with a new function to thereby produce at least one second modified class; and inserting an additional function into at least one of the classes associated with the cross platform Java program to thereby produce at least one modified class.

10. The method as recited in claim 5, further comprising overwriting at least one of the classes associated with the cross platform Java program with a corresponding one of modified classes to thereby delimit a permanent platform specific Java program.

11. The method as recited in claim 5, wherein the Java program comprises a Java applet.

12. A method of creating a platform specific Java program from a cross platform Java program, comprising:

(a) defining a first Java class which provides the ability to declare constants;

(b) defining a second Java class which provides functions that specialize other classes with respect to the declared constants in the first Java class;

(c) using the first Java class to declare specific constants pertinent to desired platform support capabilities;

(d) using the second Java class to register specialization functions which provide the desired platform support capabilities;

(e) analyzing the execution of a Java application with respect to the constants in the first Java class; and (f) based on the results of the analysis of the constants, performing resultant actions comprising selected ones of ignoring, generating, and supplying appropriate desired code using the registered specialization functions specified by the second Java class.

13. A computer program product in a computer readable medium of instructions for creating a platform specific Java application from a cross platform Java application, comprising:

instructions within the computer readable medium for receiving a cross platform Java application;

instructions within the computer readable medium for declaring at least one of the variables associated with the cross platform Java application to be a constant; and instructions within the computer readable medium for purging unused functions and associated variables from the cross platform Java application to thereby produce the platform specific Java application.

14. The computer program product as recited in claim 13, wherein instructions for purging unused functions and associated variables are provided in a Specialize class.

15. A computer program product in computer readable medium of instructions for creating a platform specific Java program from a cross platform Java program, comprising:

first instructions within the computer readable medium for defining a Constant class to declare selected variables associated with the cross platform Java program as constants;

second instructions within the computer readable medium for defining a Specialize class providing functions to specialize classes associated with the cross platform Java program with respect to the declared constants;

third instructions within the computer readable medium for evaluating the cross platform Java program in a Java run time environment using the declared constants; and fourth instructions within the computer readable medium for modifying at least one of the classes associated with the cross platform Java program to thereby produce modified classes delimiting the platform specific Java program.

16. The computer program product as recited in claim 15, wherein the fourth instructions comprise instructions within the computer readable medium for purging unused functions and associated variables from one of the classes associated with the cross platform Java program to thereby produce modified classes delimiting the platform specific Java program.

17. The computer program product as recited in claim 15, wherein the fourth instructions comprise instructions within the computer readable medium for replacing an existing function in one of the classes associated with the cross platform Java program with a new function to thereby produce modified classes delimiting the platform specific Java program.

18. The computer program product as recited in claim 15, wherein the fourth instructions comprise instructions within the computer readable medium for inserting an additional function into one of the classes associated with the cross platform Java program to thereby produce modified classes delimiting the platform specific Java program.

19. The computer program product as recited in claim 15, wherein the fourth instructions comprise:

instructions within the computer readable medium for purging unused functions and associated variables from at least one of the classes associated with the cross platform Java program to thereby produce at least one first modified class;

instructions within the computer readable medium for replacing an existing function in one of the classes associated with the cross platform Java program with a new function to thereby produce at least one second modified class; and instructions within the computer readable medium for inserting an additional function into at least one of the classes associated with the cross platform Java program to thereby produce at least one modified class.

20. The computer program product as recited in claim 15, further comprising instructions within the computer readable medium for overwriting at least one of the classes associated with the cross platform Java program with a corresponding one of modified classes to thereby delimit a permanent platform specific Java program.

21. A method of creating a platform specific Java application, comprising:

a) receiving a cross platform Java application;

b) declaring at least one of the variables associated with the received cross platform Java application to be a constant; and c) purging unused function and associated variables from the cross platform Java application;

wherein steps b) and c) are performed so as to produce the platform specific Java application.

22. A computer program product in a computer readable medium of instructions for creating a platform specific Java application from a cross platform Java application, comprising:

instructions within the computer readable medium for receiving a cross platform Java application;

instructions within the computer readable medium for declaring at least one of the variables associated with the cross platform Java application to be a constant; and instructions within the computer readable medium for purging unused functions and associated variables from the cross platform Java application;

wherein the declaring and purging are performed so as to produce the platform specific Java application.

* * * * *